(No Model.) 2 Sheets—Sheet 1.
S. A. WHITE.
BICYCLE GEARING.
No. 555,274. Patented Feb. 25, 1896.
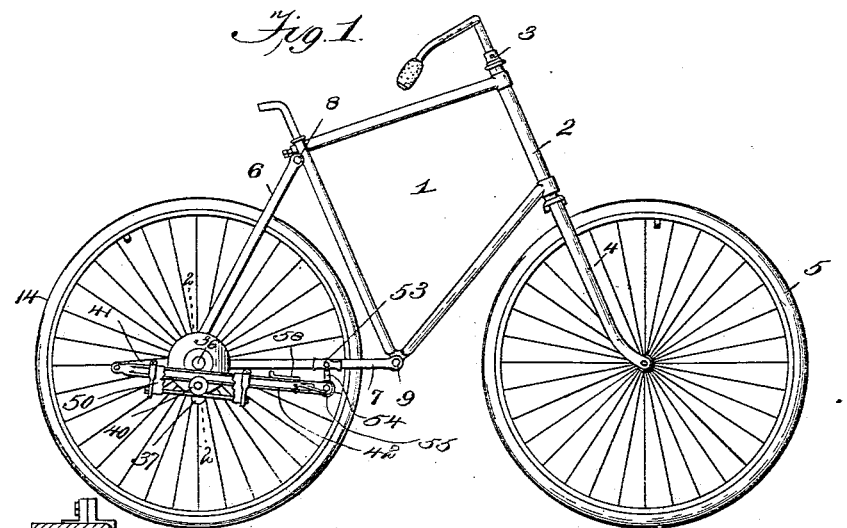
Witnesses
John O. Shaw
Inventor
Samuel A. White,
By his Attorneys,
C. A. Snow & Co.

(No Model.) 2 Sheets—Sheet 2.
S. A. WHITE.
BICYCLE GEARING.
No. 555,274. Patented Feb. 25, 1896.
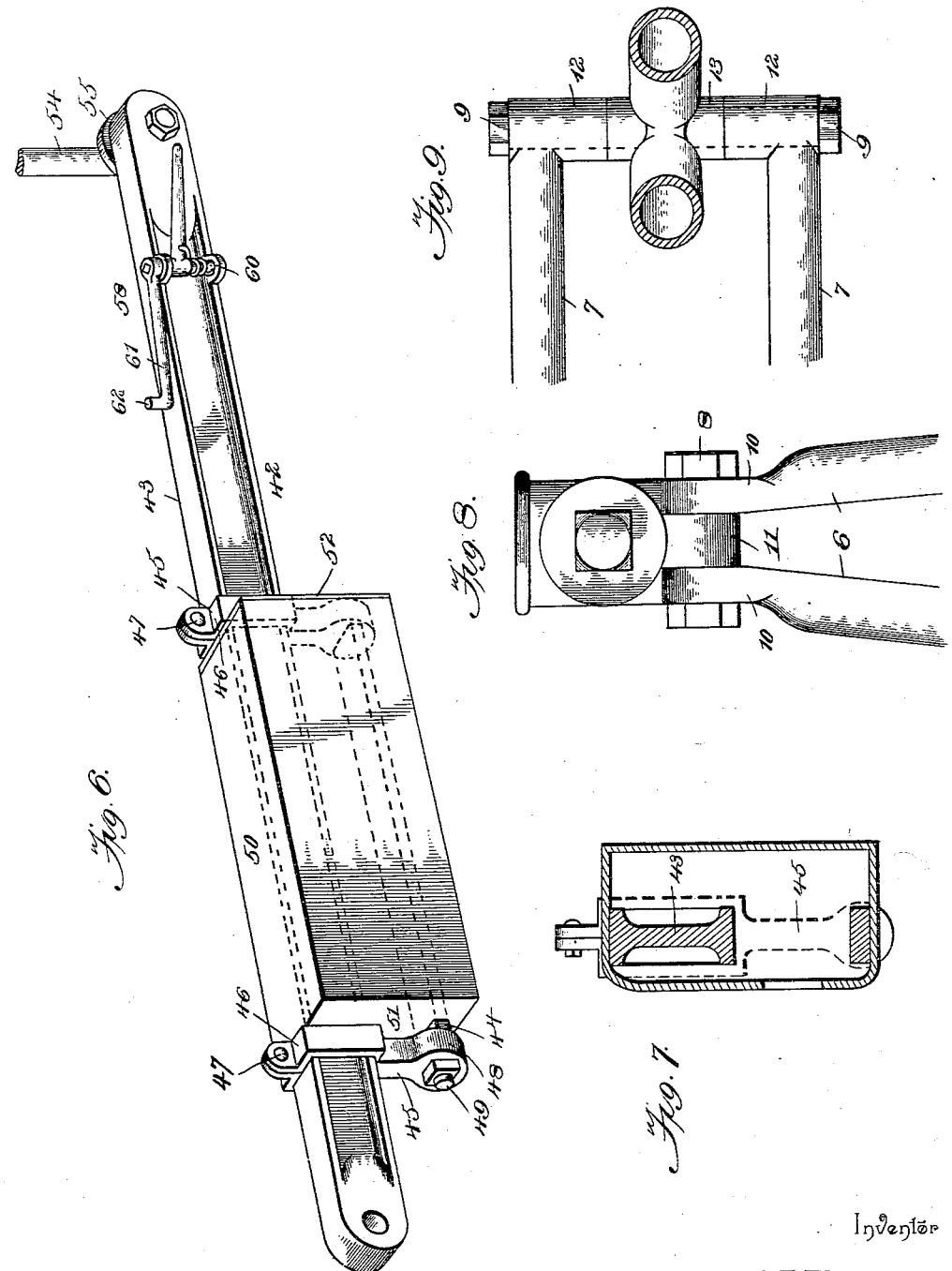
Witnesses
Inventor
Samuel A. White,
By his Attorneys,
C. A. Snow & Co.

UNITED STATES PATENT OFFICE.

SAMUEL A. WHITE, OF HARRISBURG, PENNSYLVANIA, ASSIGNOR OF ONE-HALF TO GILBERT H. WEIGLE, OF SAME PLACE.

BICYCLE-GEARING.

SPECIFICATION forming part of Letters Patent No. 555,274, dated February 25, 1896.

Application filed October 11, 1894. Serial No. 525,609. (No model.)

*To all whom it may concern:*

Be it known that I, SAMUEL A. WHITE, a citizen of the United States, residing at Harrisburg, in the county of Dauphin and State of Pennsylvania, have invented a new and useful Bicycle-Gearing, of which the following is a specification.

My invention relates to bicycles, and particularly to the means for communicating motion to the driving-wheels thereof, and the objects in view are to provide a simple and efficient speed-gearing, whereby the number of rotations of the crank which receives motion from the pedal is multiplied in the driving-wheel; to provide means for boxing or protecting the gearing to exclude dust and prevent injury to the clothing of the rider, and to provide means whereby access may be had to the interior of the boxing for the purpose of adjusting the members of the mechanism; to provide means of adjustment whereby the length of the operating-lever may be altered to suit different conditions of the road over which the machine is being propelled; to provide a simple and efficient foot-lever for communicating motion to the operating-crank, whereby lightness and strength are combined, and to provide means whereby the effective length of the operating-lever is increased during the downward movement of the operating-crank, by shifting the point of contact of the lever with said crank toward the pivotal point of the lever during the downward movement thereof.

Further objects and advantages of the invention will appear in the following description and the novel features thereof will be particularly pointed out in the appended claims.

In the drawings, Figure 1 is a view of a bicycle embodying my invention. Fig. 2 is a detail sectional view of the speed-gearing on the line 2 2 of Fig. 1. Fig. 3 is a detail view of the gearing detached. Fig. 4 is a detail side view of one end of the foot-lever to show the means for adjusting the pedal. Fig. 5 is a view of the pedal and the adjacent portion of the foot-lever. Fig. 6 is a detail view in perspective of the foot-lever with the attached dust-guard or sleeve, and the means for securing the same to the lever. Fig. 7 is a detail transverse section of the same. Fig. 8 is a detail view of the connection between the upper rear brace-bar, which forms one member of the rear section of the frame, and the front portion of said frame. Fig. 9 is a detail plan view, partly broken away, of the connection between the horizontal member of the rear portion of the frame and the connected front portion thereof.

Similar numerals of reference indicate corresponding parts in all the figures of the drawings.

1 designates the front portion of a bicycle-frame having the front sleeve, 2, in which is mounted the steering-head 3, in the fork 4 of which is arranged the front or steering wheel, 5, and 6 and 7 represent, respectively, the parts of the rear portion or member of the frame, the part 6 consisting of an inclined double brace and the part 7 of an approximately-horizontal double bar. The brace 6 and bar 7 are detachably secured to the front portion of the frame by means of bolts 8 and 9, the upper ends of the parts of the brace 6 being flattened, as shown at 10, and arranged, respectively, upon opposite sides of an eye 11, which is integral with the main or front portion of the frame, and the parts of the horizontal bar 7 being provided at their front ends with sleeves 12, which register with and are arranged upon opposite sides of a sleeve 13, forming a part of the front portion of the frame. The bolt 8 passes through the eye 11 and the registering openings in the flattened portions 10 of the brace 6, and the bolt 9 passes through the registering bores of the sleeves 12 and 13. By removing these bolts the rear portion of the frame may be detached from the front portion thereof to provide for the packing of the machine in a small space for storing or transportation.

The driving-wheel 14 is provided with an axle or shaft 15, which is mounted in bearings 16 at the rear connected ends of the brace 6 and bar 7, an adjustable disk 17 being threaded upon said shaft and combining with the spherical rollers 18 to form an anti-friction-bearing. This disk 17 is secured in place by means of a locking-nut 19, and fixed to the shaft in contact with the outer surface of the locking-nut 19 is a transmitting-pinion 20, which is held in place by means of a second locking-nut 21. Rigidly secured to the frame of the machine at equal distances from the axis of the shaft 15 are spindles 22, upon which are mounted the intermediate gears 23, which mesh with opposite sides of the central or transmitting pinion. These intermediate gears are provided with antifriction-bearings 24, having adjustable disks 25 and locking-nuts 26. Loosely mounted upon the shaft 15 beyond the outer side of the locking-nut 21 is a rotatable casing or shell 27, provided with interior gear-teeth 28, which mesh with the outer sides of the intermediate gears, said casing being provided parallel with said gear-teeth with an annular flange or rim 29, which is disposed contiguous to the outer surfaces of the intermediate gears, and is adapted to prevent unnecessary vibration of either the intermediate gears or the casing or shell, and the intermediate gears are provided upon their inner sides with flanges 30, which serve to protect the teeth thereof and the teeth 28, which form a master-gear. Secured to the frame adjacent to the inner side of the shell or casing is a dust-guard 31, the outer edge of which fits within a rabbet 32 in the inner side of the shell or casing. The shell or casing is provided with an antifriction-bearing on the shaft 15, said bearing including an adjustable disk 33, which is secured in place by means of locked nuts 34, and these members of the bearing are arranged in a cavity 35 in the outer side of the shell or casing, said cavity being closed by means of a removable cap 36.

Integral with the shell or casing is an operating-crank 37, carrying a wrist-pin 38, which is adapted to be arranged in either of a plurality of openings 39 in the crank-arm to provide for lengthening or shortening the effective portion of said crank, and mounted rotatably upon this wrist-pin adjacent to the outer surface of the crank is a guide-roller 40, also having an antifriction bearing on the pin.

The frame of the machine is extended in rear of the bearing for the driving-wheel to form an arm 41, to the extremity of which is fulcrumed the foot-lever 42, and this lever comprises a double T or H shaped bar 43, and a subjacent parallel guide-bar 44, which is connected to the main bar 43 by means of hangers 45. These hangers are provided at their upper ends with adjustable arms 46, connected at their extremities by locking-bolts 47, and are provided at their lower ends with eyes 48 for the reception of the reduced ends 49 of the guide-bar 44. The guide-roller 40 is arranged to operate between the lower side of the main bar 43 and the upper side of the guide-bar 44, and arranged between the hangers 45 and inclosing said guide-roller and the portions of the bars 43 and 44 which are between the hangers is a dust shield or sleeve 50, having one end closed, as shown at 51, and the other end fitted with a removable plate 52. One end of this shield or sleeve is left open to facilitate application to the foot-lever, and the other or closed end 51 is provided with suitable openings for the reception of the bars 43 and 44.

Mounted upon the free front end of the foot-lever is a pedal 53 having a stem or shank 54 terminating in a disk 55, which is pivotally connected to the lever. This disk 55 is rigidly connected to or integral with the stem or shank 54, and is provided with a series of perforations 56, either of which is adapted to register with a perforation 57 in the end of the lever, and 58 represents a spring-actuated latch having a terminal stud 59 adapted to engage such registering perforation. This latch is fulcrumed at 60 upon the foot-lever and is provided with a releasing-arm 61, having a terminal stud 62, which is adapted to be engaged by the heel of the rider without removing the toe from the pedal in order to disengage the stem or shank of the pedal and allow it to be adjusted to shorten or lengthen the vertical movement of the pedal.

It will be understood that in the above description of the speed-gearing I have referred to that part located at one side of the driving-wheel only, and that said mechanism is duplicated, as indicated in the drawings, upon the opposite side of the driving-wheel, and that the foot-levers are arranged to oscillate alternately, one being depressed during the upward movement of the other.

It will be understood that in order to produce a forward rotation of the driving-wheel, or a rotation thereof in a direction to cause an advance movement of the machine, the operating-crank must be turned in a reverse direction, whereby the wrist-pin descends at the rear portion of its movement in rear of the axis of the driving-wheel, and therefore it is obvious that during the time that a foot-lever is communicating motion to the wrist-pin connected therewith said wrist-pin is arranged at a less distance from the fulcrum of the lever than when said lever is ascending. Therefore the leverage is increased during the downward movement of each foot-lever, and hence the power of the machine is correspondingly multiplied.

It will be seen, furthermore, that the gearing is simple in construction, that ample means have been provided for its adjustment to take up lost motion, and that all of the parts thereof, while protected from dust, are accessible for the purpose of adjusting, replacing, &c.

Various changes in the form, proportion, and the minor details of construction may be resorted to without departing from the spirit or sacrificing any of the advantages of this invention.

Having described my invention, what I claim is—

1. The combination with a framework and a driving-wheel, of an operating-crank, connections between the crank and the driving-wheel whereby a backward rotation of the former causes a forward rotation of the latter, a foot-lever fulcrumed at its rear end in rear of the axis of said crank-arm and provided at its front end with a pedal, and a sliding connection between a wrist-pin on the crank-arm and the foot-lever, whereby the point of connection of the crank-arm with the foot-lever is at a less distance from the fulcrum of the lever during the descent of the same than during the ascent, substantially as specified.

2. The combination with a supporting-framework and a driving-wheel, of a transmitting-pinion fixed to the shaft of said wheel, spindles secured to the frame upon opposite sides of the transmitting-pinion, intermediate gears mounted upon said spindles and meshing with the transmitting-pinion, said intermediate gears being provided at their inner sides with annular flanges which terminate at the outer ends of their teeth, an internal gear mounted upon an extension of the shaft of the driving-wheel and provided with an interior flange to overlap the outer ends of the teeth of the intermediate gears, said internal gear being rabbeted at its inner edge, a circular dust-guard secured to the frame with its periphery arranged in said rabbet of the internal gear, and a crank carried by the internal gear, substantially as specified.

3. The combination with a framework, a driving-wheel, a crank, and connections between the crank and the driving-wheel, of a foot-lever operatively connected with the crank, a pedal having a perpendicularly-disposed stem or shank pivotally connected to the free end of the foot-lever and provided with a perforated disk, a pivotal spring-actuated latch mounted upon the foot-lever for engaging one of the perforations in said disk, and a trip-arm carried by and extending rearwardly from the latch and provided with a stud arranged adjacent to the side of the lever and adapted to be engaged by the heel of the operator to disengage the latch from the disk, substantially as specified.

In testimony that I claim the foregoing as my own I have hereto affixed my signature in the presence of two witnesses.

SAMUEL A. WHITE.

Witnesses:
JOHN H. SIGGERS,
G. C. SHOEMAKER.